United States Patent [19]
Andres et al.

[11] Patent Number: 6,130,529
[45] Date of Patent: Oct. 10, 2000

[54] SECONDARY OUTPUT HOLDOVER CIRCUIT FOR A SWITCH-MODE POWER SUPPLY

[75] Inventors: Joao Luiz Andres; Alessandro A. Cervone, both of Mesquite; Juan Niglio, Garland; Loveday Haachitaba Mweene, Mesquite, all of Tex.

[73] Assignee: Lucent Technologies, Inc., Murray Hill, N.J.

[21] Appl. No.: 09/469,672

[22] Filed: Dec. 22, 1999

[51] Int. Cl.[7] .................................. G05F 5/00; G05F 1/40
[52] U.S. Cl. ........................... 323/303; 323/299; 323/273
[58] Field of Search .................................. 323/273, 299, 323/303

[56] References Cited

U.S. PATENT DOCUMENTS

| | | | |
|---|---|---|---|
| 5,115,185 | 5/1992 | Fraidlin et al. | 323/207 |
| 5,258,901 | 11/1993 | Fraidlin | 363/15 |
| 5,561,596 | 10/1996 | Hemena et al. | 363/50 |
| 5,619,404 | 4/1997 | Zak | 363/21 |
| 5,631,814 | 5/1997 | Zak | 363/37 |

*Primary Examiner*—Shawn Riley
*Assistant Examiner*—Bao Q. Vu
*Attorney, Agent, or Firm*—Locke Liddell & Sapp LLP

[57] ABSTRACT

In a switching power supply generating at least a first output voltage and a second output voltage, the second output voltage, being of lower potential is applied to a linear regulator, the power supply further including a storage capacitor on the first output, a holdover circuit includes a comparator circuit for monitoring the first output voltage and for generating an output signal when the first output voltage decreases below predetermined value. A switch is connected to the storage capacitor, the comparator circuit, and the linear regulator. The switch is activated by the comparator output signal and applies the voltage stored in the storage capacitor to the linear regulator. A clamp circuit is connected to the switch for limiting the magnitude of the voltage from the storage capacitor to the linear regulator when the switch is activated.

6 Claims, 1 Drawing Sheet

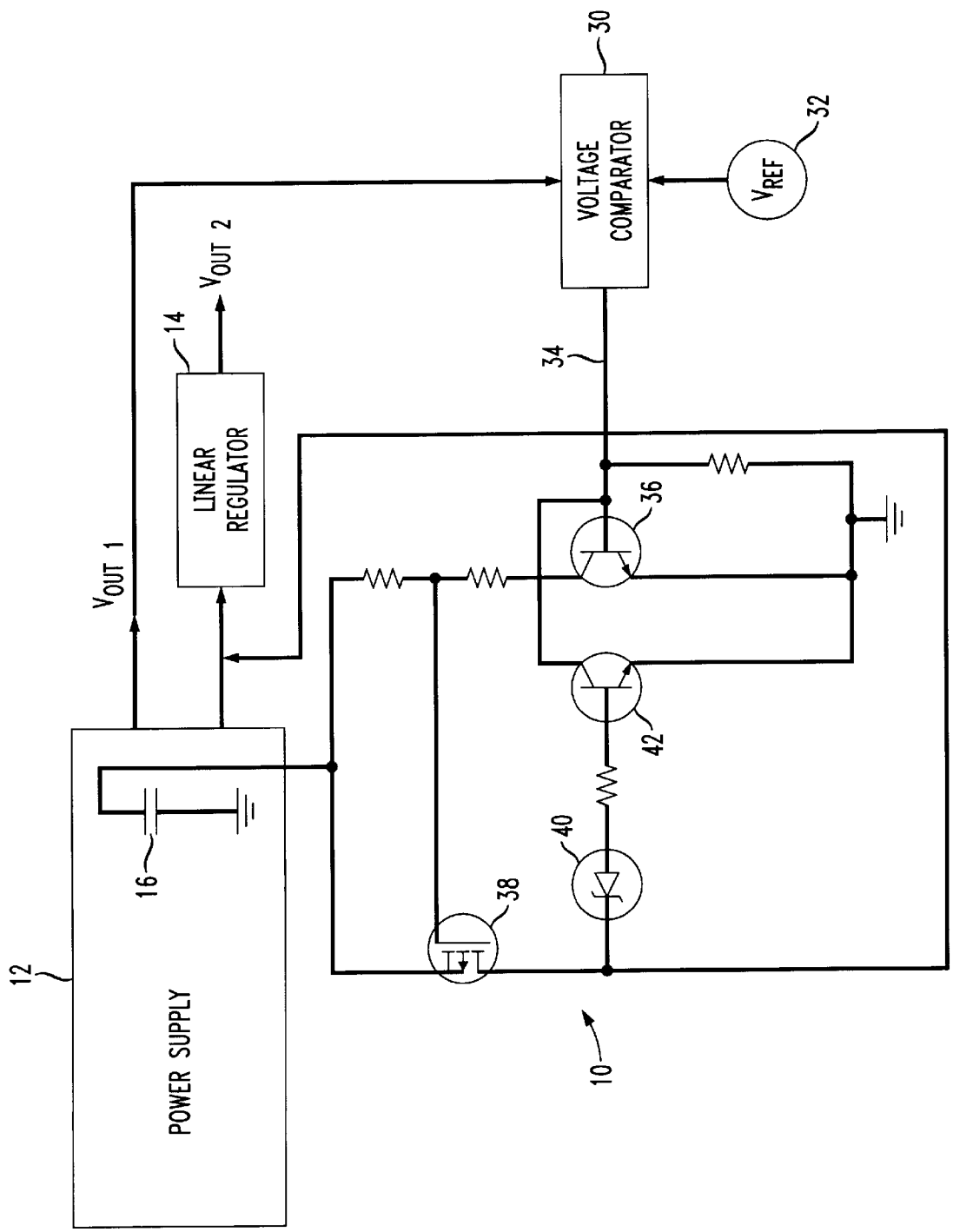

SECONDARY OUTPUT HOLDOVER CIRCUIT FOR A SWITCH-MODE POWER SUPPLY

TECHNICAL FIELD OF THE INVENTION

The present invention relates to switch-mode power supplies, and more particularly to a circuit for allowing a secondary output of the power supply to maintain short term regulation, after a loss of input power, by diverting energy stored in an output capacitor of a higher voltage to a post regulated secondary output.

BACKGROUND OF THE INVENTION

In certain applications utilizing a switch-mode power supply, a secondary, lower voltage output is required to be maintained and regulated for a predetermined time period, after a loss of input power while the main output of the power supply supports a minimal load. Since the secondary output may be post regulated, the secondary output will shutdown as soon as the regulator input voltage falls below the dropout voltage of the regulator. The addition of input bulk capacitance to the power supply in order to maintain the secondary output may not be practical since the energy would be transferred to all the outputs, resulting in increased holdover for all the outputs, and not achieving the required holdover for a desired specific output. Other holdover techniques, such as, for example, electronic shutdown of the remaining outputs, may not be practical or cost effective. Adding additional capacitance to the secondary output is also not practical since this addition would require the storage of an excessively large amount of energy to achieve the required holdover.

A need has thus arisen for a holdover circuit for diverting energy to a secondary output that is post regulated, after the loss of input power.

SUMMARY OF THE INVENTION

In accordance with the present invention, in a switching power supply generating at least a main output voltage and a second output voltage, the second output voltage, being of lower potential is applied to a linear regulator, the power supply further including a storage capacitor on the main output, a holdover circuit is provided. The holdover circuit includes a comparator circuit for monitoring the main output voltage and for generating an output signal when the main output voltage decreases below a predetermined value. A switch is connected to the storage capacitor, the comparator circuit, and the linear regulator. The switch is activated by the comparator output signal and applies the voltage stored in the storage capacitor to the linear regulator. A clamp circuit is connected to the switch for limiting the magnitude of the voltage from the storage capacitor to the linear regulator when the switch is activated.

BRIEF DESCRIPTION OF THE DRAWINGS

For a more complete understanding of the present invention and for further advantages thereof reference is now made to the following Description of the Preferred Embodiments taken in conjunction with the accompanying Drawing which is schematic block diagram of the present invention.

DESCRIPTION OF THE PREFERRED EMBODIMENTS

Referring to the FIGURE, the present holdover circuit is illustrated, and is generally identified by the numeral 10.

Holdover circuit 10 is utilized with a switch-mode power supply 12. Power supply 12 generates a plurality of outputs, two such outputs being illustrated in the FIGURE as $V_{out1}$ and $V_{out2}$. An output of power supply 12 to generate $V_{out2}$ is applied to a linear regulator 14. For purposes of discussion, it will be assumed that the voltage level of $V_{out1}$ is greater that the voltage level of $V_{out2}$, and that it is desired to maintain the output voltage level of $V_{out2}$ for a predetermined time period after loss of power from power supply 12. Power supply 12 includes storage capacitors 16 which are charged to the value of the voltage of $V_{out1}$ during operation of power supply 12. In operation of circuit 10, $V_{out2}$ is maintained for a predetermined time period by diverting energy stored in storage capacitors 16 to linear regulator 14 and thereby increasing the holdover of $V_{out2}$.

The $V_{out1}$ output of power supply 12 is applied to a voltage comparator 30 which also receives as an input a reference voltage from a voltage reference source 32. Comparator 30 generates an output signal along signal line 34 when $V_{out1}$ drops below a predetermined voltage level. The output of voltage comparator 30 is connected to a switch 36. Switch 36 may comprise, for example, a transistor which is turned on by the output of voltage comparator 30. Switch 36 is connected to a switch 38 such as, for example, a P-channel field effect transistor (FET). Storage capacitors 16 of power supply 12 are also connected to switch 38. When switch 36 is actuated, switch 36 pulls the gate voltage of switch 38 lower than the source voltage thereby turning switch 38 on. When switch 38 is on, the energy stored in storage capacitor 16 begins to bleed to linear regulator 14.

If the voltage applied to linear regulator 14 via switch 38 exceeds a predetermined value or rises too quickly, linear regulator 14 will shut down. Therefore, a voltage clamp circuit is connected to switch 38. Voltage clamp circuit includes a zener diode 40 and transistor 42 which operate to clamp the gate of switch 38 to a level approximately the maximum steady state value of linear regulator 14. The input to linear regulator 14 from switch 38 will be regulated to the voltage of zener diode 40 plus the base emitter voltage of transistor 42 thereby applying a continuous voltage to linear regulator 14 and ensuring proper operation of linear regulator 14. Failure to limit the voltage applied to linear regulator 14 or regulate the rate of voltage increase may result in improper operation of linear regulator 14. Therefore, the present clamp circuit ensures maintaining $V_{out2}$ after energy has been diverted from storage capacitors 16 within power supply 12.

Circuit 10 may apply a voltage level of 13 volts, for example, to linear regulator 14 such that linear regulator 14 generates $V_{out2}$ at 10 volts. $V_{out1}$ voltage level, may comprise, for example, 40 volts, which if directly applied to linear regulator 14 may cause linear regulator 14 to shut down.

Whereas the present invention has been described with respect to specific embodiments thereof, it will be understood that various changes and modifications will be suggested to one skilled in the art and it is intended to encompass such changes and modifications as fall within the scope of the appended claims.

What is claimed is:

1. In a switching power supply generating at least a first output voltage and a second output voltage, the second output voltage having a lower potential than the first output voltage and is applied to a linear regulator, the power supply further including a storage capacitor on the first output, a holdover circuit comprising:

a comparator circuit for monitoring the first output voltage and for generating an output signal when the first output voltage decreases below a predetermined value;

a switch connected to the storage capacitor, said comparator circuit, and the linear regulator, said switch being activated by said comparator circuit output signal for applying a voltage stored in the storage capacitor to the linear regulator; and a clamp circuit connected to said switch for limiting the magnitude of the voltage from the storage capacitor to the linear regulator when said switch is activated.

2. The holdover circuit of claim 1 wherein said clamp circuit includes a zener diode and transistor.

3. A switching power supply comprising:

a power supply for generating at least a first output voltage and a second output voltage;

a linear regulator connected to receive said second output voltage;

a storage capacitor connected to said power supply;

a comparator circuit for monitoring said first output voltage and for generating an output signal when said first output voltage decreases below a predetermined value;

a switch connected to said storage capacitor, said comparator circuit, and said linear regulator, said switch being activated by said comparator circuit output signal for applying a voltage stored in said storage capacitor to said linear regulator; and a clamp circuit connected to said switch for limiting the magnitude of voltage from said storage capacitor to said linear regulator, when said switch is activated.

4. The power supply of claim 3 wherein said clamp circuit includes a zener diode and transistor.

5. The power supply of claim 3 wherein said first output voltage is greater than said second output voltage.

6. The power supply of claim 3 wherein said predetermined voltage applied to said linear regulator is less than said voltage stored in said storage capacitor.

* * * * *